(12) United States Patent
Allais et al.

(10) Patent No.: US 7,633,014 B2
(45) Date of Patent: Dec. 15, 2009

(54) SUPERCONDUCTOR CABLE

(75) Inventors: Arnaud Allais, Hannover (DE); Frank Schmidt, Langenhagen (DE)

(73) Assignee: Nexans, Paris (FR)

( * ) Notice: Subject to any disclaimer, the term of this patent is extended or adjusted under 35 U.S.C. 154(b) by 333 days.

(21) Appl. No.: 11/384,032

(22) Filed: Mar. 17, 2006

(65) Prior Publication Data

US 2007/0029104 A1 Feb. 8, 2007

(30) Foreign Application Priority Data

Apr. 27, 2005 (EP) .................................. 05290931

(51) Int. Cl.
*H01B 12/00* (2006.01)
(52) U.S. Cl. ..................... 174/125.1; 29/599
(58) Field of Classification Search .............. 174/125.1; 29/599
See application file for complete search history.

(56) References Cited

U.S. PATENT DOCUMENTS

| 3,730,966 | A | * | 5/1973 | Aupoix et al. | 174/15.5 |
| 6,759,593 | B2 | * | 7/2004 | Spreafico | 174/125.1 |
| 7,038,141 | B2 | * | 5/2006 | Perez et al. | 174/125.1 |
| 2003/0183410 | A1 | * | 10/2003 | Sinha et al. | 174/68.1 |

* cited by examiner

*Primary Examiner*—Ishwar (I. B.) Patel
(74) *Attorney, Agent, or Firm*—Sofer & Haroun, LLP

(57) ABSTRACT

A superconductor cable includes a superconductive cable core (1) and a cryostat (2) enclosing the same. The cable core (1) has a superconductive conductor (3), an insulation (4) surrounding the same and a shielding (5) surrounding the insulation (4). A layer (3b) of a dielectric or semiconducting material is applied to a central element (3a) formed from a normally conducting material as a strand or tube and a layer (3c) of at least one wire or strip of superconductive material is placed helically on top. The central element (3a) and the layer (3c) are connected to each other in an electrically conducting manner at the ends of the cable core (1).

12 Claims, 2 Drawing Sheets

SUPERCONDUCTOR CABLE

GOVERNMENT LICENSE RIGHTS

This invention was made with government support under contract No. DE-FC36-00GO13032 awarded by the Department of Energy (DOE). The government has certain rights in the invention.

RELATED APPLICATION

This application is related to and claims the benefit of priority from European Patent Application No. 05290931.4, filed on Apr. 27, 2005, the entirely of which is incorporated hereby reference.

FIELD OF THE INVENTION

The invention relates to a superconductor cable according to the precharacterizing clause of Patent claim 1.

BACKGROUND

WO 00/39813 discloses a superconductor cable which comprises a tubular carrier on which a first layer of superconductive strips is wound.

The first layer is surrounded by a dielectric, on which a second layer of superconductive strips is wound.

The superconductive strips are located within a metallic layer.

In the case of this superconductor cable, the first layer serves as a phase conductor and the second layer as a return conductor. The phase conductor and the return conductor run coaxially in relation to each other.

On the second layer there is a further layer of copper strips, which serve as stabilization in the event that the cooling of the cable fails or a short-circuit occurs. The copper strips are in direct contact with the metallic layer in which the superconductor material is located.

A number of conductors constructed in this way are located in a cryostat, which insulates the superconductors from externally occurring heat.

The disadvantage of this conductor design is that the direct contact of the conductor of superconductive material with the conductor of normally conducting material and less than optimum stranding of the various layers cause losses to occur in the cable.

OBJECTS AND SUMMARY

The present invention is based on the object of providing a conductor for a superconductive cable which ensures that, during normal operation, the current flow is primarily in the superconductive material and the current flowing in the normally conducting material is reduced to the greatest extent. On the other hand, the conductor of normally conducting material is intended to be capable of conducting the entire current in the event of a short-circuit or in the event of the transition temperature being exceeded.

This object is achieved by the features presented in the characterizing clause of Patent claim 1.

The invention achieves the effect that an advantageous distribution of the current in the cable is achieved by allowing for the inductive and ohmic resistances, so that, during normal operation, the current flow is primarily in the superconductive material and, in the case of a multilayered superconductive material, is optimally distributed between the layers, whereas in the event of a short-circuit the current is carried primarily by the layers of normally conducting material.

To this end the present invention provides for a superconductor cable is described, comprising a superconductive cable core (1) and a cryostat (2) enclosing the same. The cable core (1) comprises a superconductive conductor (3), an insulation (4) surrounding the same and a shielding (5) surrounding the insulation (4). A layer (3b) of a dielectric or semiconducting material is applied to a central element (3a) formed from a normally conducting material as a strand or tube and a layer (3c) of at least one wire or strip of superconductive material is placed helically on top. The central element (3a) and the layer (3c) are connected to each other in an electrically conducting manner at the ends of the cable core (1).

BRIEF DESCRIPTION OF THE DRAWINGS

The invention is explained in more detail on the basis of the exemplary embodiments schematically represented in FIGS. 1 and 2.

DETAILED DESCRIPTION

Figure 1:
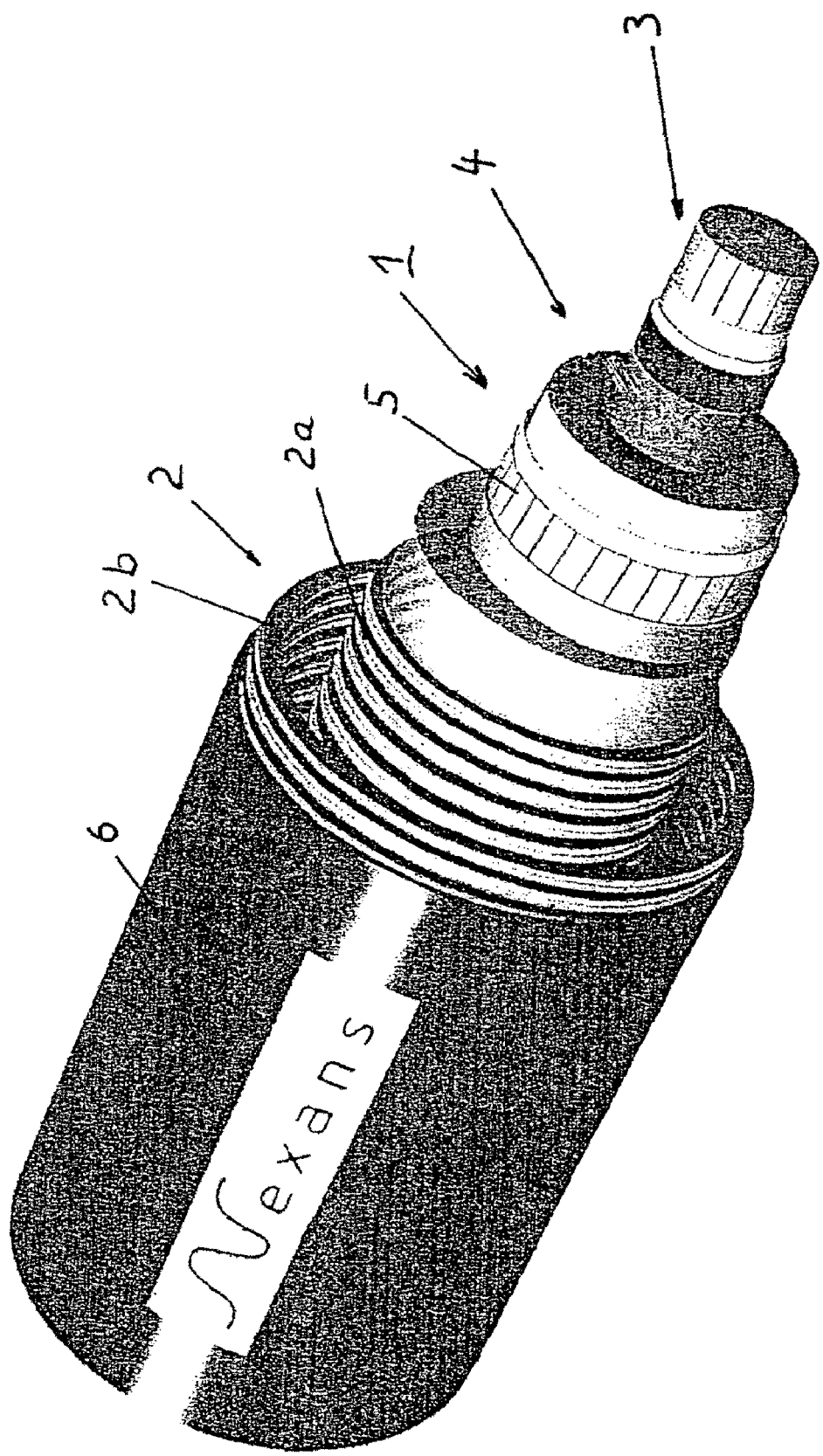
FIG. 1 shows a superconductor cable, in accordance with one embodiment of the invention.

FIG. 1 shows a superconductor cable, comprising a superconductive cable core 1 and a cryostat 2, in which the cable core 1 is arranged. The cable core 1 has a superconductive conductor 3, an insulating layer 4 and a shielding 5.

Figure 2:
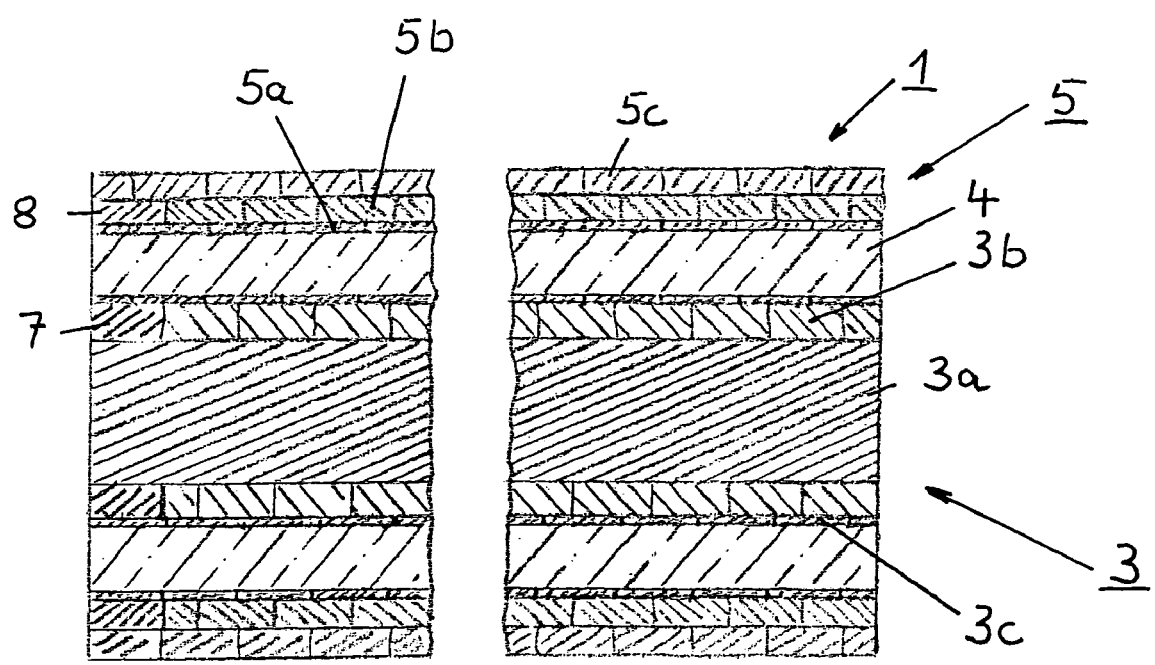
FIG. 2 shows a lateral section through the cable core 1.

The construction of the superconductive conductor 3 and the shielding 5 is explained in more detail on the basis of FIG. 2.

The insulating layer 4 comprises a multiplicity of layers of insulating material in strip form, preferably of paper or of paper laminated with polypropylene (PPLP).

The cryostat 2 comprises two corrugated metal tubes 2a, 2b, preferably of stainless steel, which are arranged concentrically in relation to each other and are spaced apart from each other by a spacer not represented in any more detail. The annular gap between the cable core 1 and the inner corrugated tube 2a and the annular gap between the corrugated tubes 2a and 2b serve for transporting the cooling medium.

On the outer corrugated tube 2b there is also an extruded plastic sheath 6.

Three identical superconductor cables form a power transmission system.

FIG. 2 shows a lateral section through the cable core 1.

The conductor 3 of the cable core 1 comprises a central element 3a, which takes the form of a tube or else—as represented in the figure—a strand comprising a multiplicity of stranded-together copper wires. With particular advantage, the central element comprises one or more layers of stranded normally conducting wires.

On the central element 3a there is a layer 3b of a dielectric or semiconducting material. The layer 3b comprises a number of layers of paper or carbon paper.

On the layer 3b there is at least one layer 3c of superconductive wires or strips, which are stranded onto the layer 3b. The length of lay of the superconductive wires or strips of the layer 3c is greater than $3D_1$, where $D_1$ is the outside diameter of the layer 3b.

At each of the ends of the conductor 3, the central element 3a with the layer 3c of superconductive material is connected to a connecting part 7. The connecting parts 7 preferably take the form of copper rings, which are soldered both to the central element 3a and to the wires or strips of the layer 3c.

Over the layer 3c is the insulating layer 4, which comprises a multiplicity of individual layers of strips of paper coated with polypropylene.

On the insulating layer 4 is the shielding 5, which comprises a first layer 5a of superconducting material. The layer 5a is constructed in a way similar to the layer 3c of the conductor 3. The length of lay of the wires or strips of the layer 5a is greater than $3D_2$, where $D_2$ is the outside diameter of the insulating layer 4.

Over the layer 5a is a layer 5b, which is constructed in the same way as the layer 3b of the conductor 3.

On the layer 5b there lies a layer 5c of normally conducting material. The layer 5c advantageously comprises at least one strip of copper, which is firmly wound onto the layer 5b. At the ends of the shielding 5, the layers 5a and 5c are connected to each other by connecting elements 8. Like the connecting elements 7, the connecting elements 8 preferably take the form of copper rings, which are soldered to the layers 5a and 5c.

Wires in strip form, on the surface of which or in the interior of which the superconductive material is located, are used with particular advantage for the superconductive layers 3c and 5a. The superconductive material is a ceramic, preferably based on mixed oxides of copper, barium and yttrium (YBCO), bismuth, lead, strontium, calcium, copper, thallium and mercury (BSCCO) or similar mixtures.

The length of lay of the strip or the strips of the layer 5c is greater than $3D_2$, where $D_2$ is the outside diameter of the insulating layer 4.

The invention claimed is:

1. A superconducting cable, comprising:
   a superconductive cable core having a superconductive conductor, an insulation surrounding the superconductive conductor and a shielding surrounding the insulation;
   a cryostat, enclosing the superconductive cable core;
   a layer of a dielectric or semiconducting material applied to a central element formed from a normally conducting material as a strand or tube; and
   a layer of at least one wire or strip of superconductive material placed helically onto the layer of a dielectric or semiconducting material, wherein the central element and the layer of superconductive material are connected to each other in an electrically conducting manner at the ends of the cable core, wherein the electrical connection provided at each end of the cable core is produced by at least one ring of copper, which is provided between the central element and the layer of superconductive material and is in electrically conducting contact with the central element and the layer of superconductive material, and wherein each ring is connected both to the central element and to the layer of superconductive material by a soldered connection.

2. The superconductor cable according to claim 1, wherein the layer of dielectric or semiconducting material is a layer of a thermoplastic material or paper applied to the central element.

3. The superconductor cable according to claim 2, wherein the layer of dielectric or semiconducting material has at least one layer of material in strip form applied helically to the conductor.

4. The superconductor cable according to claim 2, wherein the layer of dielectric or semiconducting material has one or more layers of paper strip laminated with polypropylene.

5. The superconductor cable according to claim 1, wherein the layer of dielectric or semiconducting material has one or more layers of carbon paper.

6. The superconductor cable according to claim 1, wherein the shielding has a first layer of superconductive wires or strips resting on the insulating layer, which is applied helically to the insulating layer, a second layer, having at least one wire or strip of normally conducting material, and also a layer of a dielectric or of a semiconducting material located between the first layer and the second layer, and in that the first layer and the second layer are connected to each other in an electrically conducting manner at the ends of the shielding.

7. The superconductor cable according to claim 6, wherein the electrical connection is produced by at least one ring of copper, which is provided between the two layers and is in electrically conducting contact with both layers.

8. The superconductor cable according to claim 7, wherein each ring is connected both to the layer of superconductive material and to the layer of normally conducting material by a soldered connection.

9. The superconductor cable according to claim 1, wherein the at least one wire or the at least one strip of the first layer of superconductive material is applied to the layer of dielectric or semiconducting material with a length of lay which is greater than $3D_1$, where $D_1$ is the outside diameter of the layer.

10. The superconductor cable according to claim 1, wherein the at least one wire or the at least one strip of the first layer of the shielding is applied to the insulation with a length of lay which is greater than $3D_2$, where $D_2$ is the outside diameter of the insulation.

11. The superconductor cable according to claim 1, wherein the lengths of lay of a plurality of superconductive layers are chosen with allowance for the inductive and resistive components of the impedance when the superconductor is operated with alternating current, in such a way that, during normal operation, a current distribution in which the current flow is primarily in the superconductive layers is obtained and, in the case of operation with a short-circuit current, a current distribution in which the current flows primarily in the layers of normally conducting material is obtained.

12. A superconducting cable, comprising:
   a superconductive cable core having a superconductive conductor, an insulation surrounding the superconductive conductor and a shielding surrounding the insulation;
   a cryostat, enclosing the superconductive cable core;
   a layer of a dielectric or semiconducting material applied to a central element formed from a normally conducting material as a strand or tube; and
   a layer of at least one wire or strip of superconductive material is placed helically onto the layer of a dielectric or semiconducting material, wherein the central element and the layer of superconductive material are connected to each other in an electrically conducting manner at the ends of the cable core,
   wherein the shielding has a first layer of superconductive wires or strips resting on the insulating layer, which is applied helically to the insulating layer, a second layer, having at least one wire or strip of normally conducting material, and also a layer of dielectric or of semiconducting material located between the first layer and the second layer, and in that the first layer and the second layer are connected to each other in an electrically conducting manner at the ends of the shielding, wherein the electrical connection is produced by at least one ring of copper, which is provided between the two layers and is in electrically conducting contact with both layers and wherein each ring is connected both to the layers of superconductive material and to the layer of normally conducting material by a soldered connection.

* * * * *